(12) United States Patent
Chillar et al.

(10) Patent No.: US 8,347,598 B2
(45) Date of Patent: Jan. 8, 2013

(54) APPARATUS FOR STARTING UP COMBINED CYCLE POWER SYSTEMS AND METHOD FOR ASSEMBLING SAME

(75) Inventors: Rahul Chillar, Atlanta, GA (US); David L. Rogers, Atlanta, GA (US); Vijay Nenmeni, Atlanta, GA (US); Julio Mestroni, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 13/051,661

(22) Filed: Mar. 18, 2011

(65) Prior Publication Data
US 2012/0233978 A1    Sep. 20, 2012

(51) Int. Cl.
| F02C 6/00 | (2006.01) |
| F02C 7/22 | (2006.01) |
| F02C 7/26 | (2006.01) |
| F02G 1/00 | (2006.01) |
| F02G 3/00 | (2006.01) |

(52) U.S. Cl. ...................................... 60/39.182; 60/778
(58) Field of Classification Search ............... 60/39.182, 60/39.3, 778
See application file for complete search history.

(56) References Cited

U.S. PATENT DOCUMENTS

| 3,974,644 A * | 8/1976 | Martz et al. ................. 60/39.182 |
| 4,226,086 A * | 10/1980 | Binstock et al. ................. 60/656 |
| 4,282,708 A | 8/1981 | Kuribayashi et al. |
| 4,584,836 A | 4/1986 | McClelland |
| 4,598,551 A | 7/1986 | Dimitroff, Jr. et al. |
| 4,651,532 A | 3/1987 | Abe |
| 5,095,706 A | 3/1992 | Saito et al. |
| 5,412,936 A | 5/1995 | Lee et al. |
| 5,473,898 A | 12/1995 | Briesch |
| 6,003,317 A | 12/1999 | Neubert |
| 6,766,646 B1 | 7/2004 | Ford et al. |
| 6,782,703 B2 | 8/2004 | Dovali-Solis |
| 7,555,890 B2 | 7/2009 | Kurihara et al. |
| 7,621,133 B2 | 11/2009 | Tomlinson et al. |
| 7,765,807 B2 | 8/2010 | Diesterbeck et al. |
| 2004/0013511 A1 | 1/2004 | Brackenhammer et al. |
| 2009/0249788 A1 | 10/2009 | Diesterbeck et al. |

FOREIGN PATENT DOCUMENTS

| EP | 0537307 A1 | 3/1992 |
| EP | 1674667 A1 | 12/2004 |
| EP | 1775431 A1 | 12/2005 |

* cited by examiner

*Primary Examiner* — William H Rodriguez
*Assistant Examiner* — Carlos A Rivera
(74) *Attorney, Agent, or Firm* — Armstrong Teasdale LLP (57) ABSTRACT

A method for assembling a combined cycle power generation system includes coupling a gas turbine in flow communication with a heat recovery steam generator (HRSG). The method also includes coupling a steam turbine in flow communication with the HRSG via at least one steam conduit. The method further includes coupling at least one heating element to a portion of the at least one steam conduit. The method also includes operatively coupling at least one controller to the at least one heating element. The method further includes programming the at least one controller to vary a rate of temperature change in the portion of the at least one steam conduit.

15 Claims, 5 Drawing Sheets

APPARATUS FOR STARTING UP COMBINED CYCLE POWER SYSTEMS AND METHOD FOR ASSEMBLING SAME

BACKGROUND OF THE INVENTION

The embodiments described herein relate generally to combined cycle power generation systems and, more particularly, to methods and apparatus that facilitate starting such systems.

At least some known combined cycle power systems include one or more gas turbines, at least one heat recovery steam generator (HRSG), and at least one steam turbine. The HRSG and the steam turbine are coupled in flow communication via steam piping. Sufficiently warming the steam piping by channeling steam from the HRSG to the steam turbine facilitates attaining the proper steam conditions at an inlet to the steam turbine. Known combined cycle system startup procedures require steam produced from the HRSG to initially bypass the steam turbine until pressures and temperatures are within predetermined superheat parameters or within ranges suitable for admitting steam to the steam turbine.

During this bypass operation, a section of steam piping between the bypass line and closed steam turbine inlet isolation valves does not receive warming steam flow. Therefore, warming this section of steam piping to the predetermined temperature range cannot be facilitated by the bypass operation. These dead-headed sections are filled with non-moving, or stagnant, fluid that cools to temperatures below those parameters suitable for steam turbine admission. Therefore, upon completion of bypass operations, this section of steam line needs to be heated to a range within those predetermined parameters prior to steam admission to the steam turbine. Heating this section of steam line subsequent to the bypass operations delays steam admission to the steam turbine. This delay may exceed 20 minutes, thereby further extending the overall combined cycle start time. Moreover, the length of piping with stagnant fluid therein could be significant, thereby extending the delay associated with warming up the associated sections of the affected piping. Furthermore, such delays facilitate additional fuel consumption, thereby decreasing the efficiency of the combined cycle power systems and increasing emissions therefrom. Furthermore, admission of hot, live steam to sections of piping containing stagnant, relatively cold fluid may induce additional stresses in the associated steam piping, thereby facilitating a reduction in an expected lifetime of the piping.

Some known combined cycle power systems have used such traditional starting procedures at least in part because such systems were based-loaded and startups may have been infrequent. Moreover, there may have been no sense of urgency because any known startup delays would be taken into account during the infrequent startups. However, with increased and more frequent day-to-night power price swings, such unplanned startups have become more frequent. For example, there is an increasing trend to use combined cycle power plants as daily peaking units because of the periodic changes of electric power demand and fuel prices. Also, some renewable energy sources, for example, wind turbines, may experience sudden reductions in wind, thereby facilitating unplanned starts of combined cycle power systems. The steam line heating delay described above may decrease timely commercial delivery of electric power generation from the combined cycle power systems.

Some known combined cycle power systems include additional piping and valving positioned closer to the steam turbine inlet isolation valves. The additional piping and valving is costly to install, is costly to maintain, facilitates additional points of failure during startups, and is difficult to install during steam turbine retrofits.

BRIEF DESCRIPTION OF THE INVENTION

In one aspect, a method for assembling a combined cycle power generation system is provided. The method includes coupling a gas turbine in flow communication with a heat recovery steam generator (HRSG). The method also includes coupling a steam turbine in flow communication with the HRSG via at least one steam conduit. The method further includes coupling at least one heating element to a portion of the at least one steam conduit. The method also includes operatively coupling at least one controller to the at least one heating element. The method further includes programming the at least one controller to vary a rate of temperature change in the portion of the at least one steam conduit.

In another aspect, a steam conduit heating system is provided. The steam conduit heating system includes at least one electric heating element coupled to at least a portion of a steam conduit. The system also includes at least one conduit heating controller operatively coupled to the at least one heating element. The controller is programmed to vary a rate of temperature change in the portion of the steam conduit. The at least one controller is further programmed to vary the rate of temperature change in the portion of the steam conduit as a function of at least one of a mass of the portion of the steam conduit and a shape of the portion of the steam conduit.

In yet another aspect, a combined cycle power generation system is provide. The system includes a gas turbine coupled to a first generator. The system also includes a steam turbine coupled to a second generator. The system further includes a heat recovery steam generator (HRSG) coupled to the steam turbine and the gas turbine. The HRSG is coupled in flow communication to the steam turbine via at least one steam conduit. The system also includes a conduit heating system coupled to a portion of the at least one steam conduit. The conduit heating system includes at least one electric heating element. The conduit heating system also includes at least one controller operatively coupled to the at least one heating element. The controller is programmed to vary a rate of temperature change in the portion of the at least one steam conduit.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
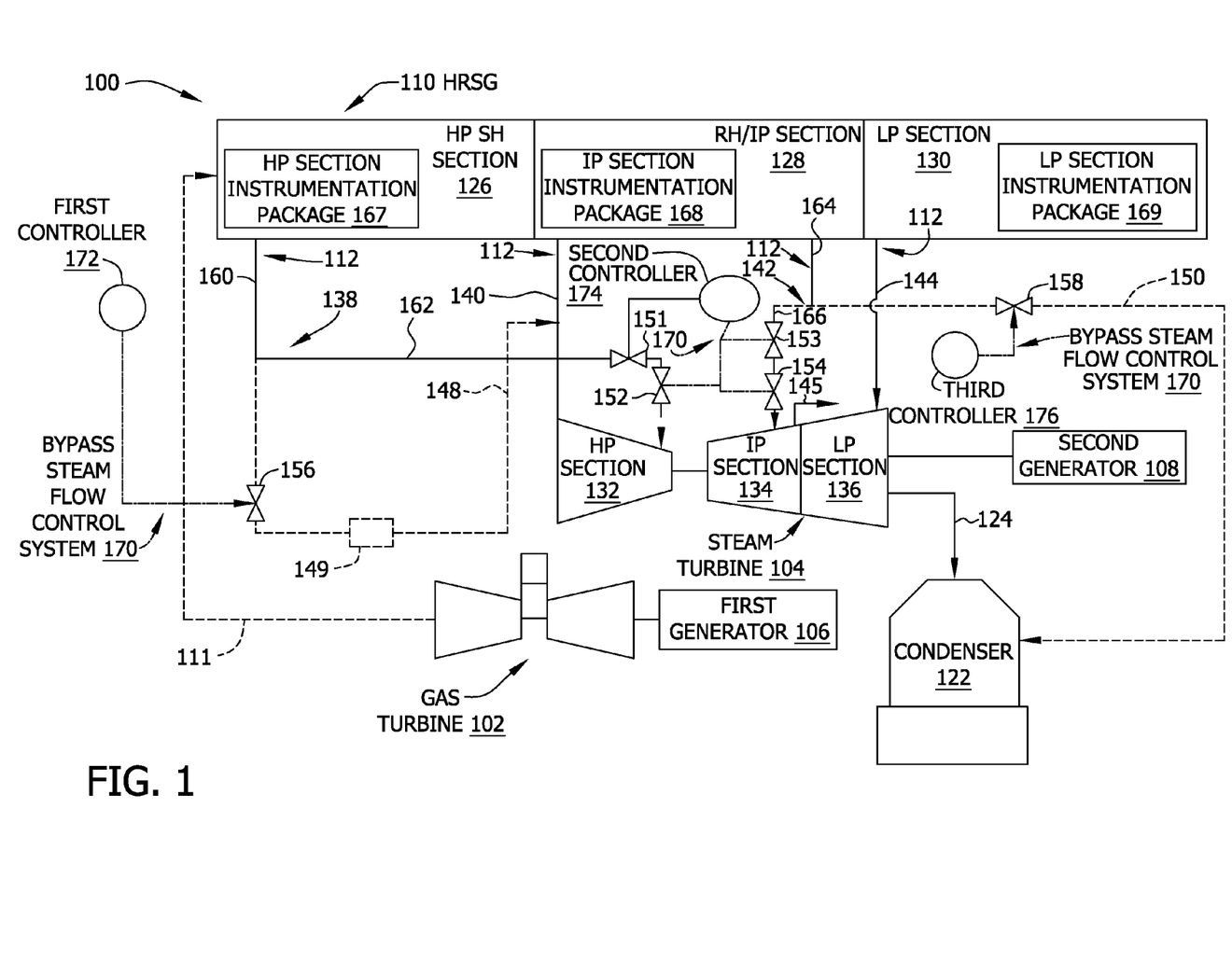
FIG. 1 is a schematic view of an exemplary combined cycle power system.

FIG. 1 is a schematic illustration of an exemplary combined cycle power system 100. System 100 includes a gas turbine 102 and a steam turbine 104 rotatably coupled to a first electric power generator 106 and a second electric power 108, respectively. System 100 also includes a heat recovery steam generator (HRSG) 110 coupled in flow communication with gas turbine 102 via an exhaust gas conduit 111.

In the exemplary embodiment, a single gas turbine 102 is coupled to a single HRSG 110 that is coupled to a single steam turbine 104. Alternatively, a plurality of gas turbines 102 are coupled to a plurality of HRSGs 110 that are coupled to a single steam turbine 104. Also, alternatively, combined cycle power system 100 includes any number of gas turbines 102, any number of HRSGs 110, and any number of steam turbines 104 that enables operation of system 100 as described herein.

In the exemplary embodiment, steam turbine 104 is coupled in flow communication with HRSG 110 via multiple steam conduits 112. As used herein, steam conduits 112 include piping and/or tubing of any material and of any gauge that enables operation of system 100 as described herein. Steam turbine 104 is also coupled in flow communication with a condenser 122 via a low pressure steam exhaust conduit 124. In the exemplary embodiment, HRSG 110 includes a high pressure (HP) superheater section 126, a reheater/intermediate pressure (RH/IP) section 128, and a low pressure (LP) section 130. Similarly, steam turbine 104 includes an HP section 132, an IP section 134, and a LP section 136. In the exemplary embodiment, steam conduits 112 include an HP superheated steam conduit 138 that couples HP superheater section 126 in flow communication with HP section 132. Steam conduits 112 also include a cold reheat (CRH) steam conduit 140 that couples HP section 132 in flow communication with RH/IP section 128. Steam conduits 112 further include a hot reheat (HRH) steam conduit 142 that couples RH/IP section 128 in flow communication with IP section 134. Steam conduits 112 also include an LP steam conduit 144 that couples LP section 130 in flow communication with LP section 136. Moreover, steam turbine 104 includes a steam cross-over conduit 145 coupling IP section 134 in flow communication with LP section 136. In many embodiments of system 100, steam conduits 112 including HP superheated steam conduit 138, CRH steam conduit 140, HRH steam conduit 142, and LP steam conduit 144 have lengths in a range of approximately 100 meters (m) (approximately 328 feet (ft)) to approximately 200 m (656 ft).

Combined cycle power system 100 further includes an HP bypass conduit 148 that couples HP superheated steam conduit 138 in flow communication with CRH steam conduit 140. HP bypass conduit 148 includes at least one attemperator 149. System 100 also includes an IP bypass conduit 150 that couples HRH steam conduit 142 in flow communication with condenser 122. System 100 further includes a main stop valve (MSV) 151 and a main control valve (MCV) 152 positioned in HP superheated steam conduit 138 just upstream of HP section 132, e.g., within a range of approximately 2 m (approximately 6 ft) to approximately 4 m (approximately 12 ft). System 100 also includes an intermediate stop valve (ISV) 153 and an intermediate control valve (ICV) 154 positioned in HRH steam conduit 142 just upstream of IP section 134 e.g., within a range of approximately 2 m (approximately 6 ft) to approximately 4 m (approximately 12 ft). System 100 further includes an HP bypass valve 156 positioned within HP bypass conduit 148, and an IP bypass valve 158 positioned within IP bypass conduit 150.

In the exemplary embodiment, HP superheated steam conduit 138 includes a first portion, i.e., a live steam portion 160 coupled in direct flow communication with, and extending between, HRSG 110 and HP bypass conduit 148. HP superheated steam conduit 138 also includes a second portion, i.e., a dead-headed portion 162 coupled in direct flow communication with, and extending between, live steam portion 160, HP bypass conduit 148, and main stop valve MSV 151. In the exemplary embodiment, live steam portion 160 is in a range of approximately 15 m (approximately 50 ft) to approximately 30 m (approximately 100 ft) in length. Also, in the exemplary embodiment, dead-head portion 162 is in a range of approximately 91 m (approximately 300 ft) to approximately 122 m (approximately 400 ft) in length. Alternatively, live steam portion 160 and dead-head portion 162 have any lengths that enable operation of combined cycle power system 100 as described herein.

Also, in the exemplary embodiment, HRH steam conduit 142 includes a first portion, i.e., a live steam portion 164 coupled in direct flow communication with, and extending between, HRSG 110 and IP bypass conduit 150. HRH steam conduit 142 also includes a second portion, i.e., a dead-headed portion 166 coupled in direct flow communication with, and extending between, live steam portion 164, IP bypass conduit 150, and intermediate stop valve ISV 153. In the exemplary embodiment, live steam portion 164 is in a range of approximately 91 m (approximately 300 ft) to approximately 122 m (approximately 122 ft) in length. Also, in the exemplary embodiment, dead-head portion 166 is in a range of approximately 61 m (approximately 200 ft) to approximately 76 m (approximately 250 ft) in length. Alternatively, live steam portion 164 and dead-head portion 166 have any lengths that enable operation of combined cycle power system 100 as described herein.

In the exemplary embodiment, HRSG 110 includes an HP section instrumentation package 167. HRSG 110 also includes an IP section instrumentation package 168. HRSG 110 further includes an LP section instrumentation package 169. Instrumentation packages 167, 168, and 169 include any instrumentation that enables operation of HRSG 110 and system 100 as described herein including, without limitation, temperature, pressure, and flow measurement devices.

In the exemplary embodiment, combined cycle power system 100 also includes a bypass steam flow control system 170. System 170 includes a first controller 172 operatively coupled to HP bypass valve 156. System 170 also includes a second controller 174 operatively coupled to MSV 151, MCV 152, ISV 153, and ICV 154. System 170 also includes a third controller 176 operatively coupled to IP bypass valve 158. Alternatively, bypass steam flow control system 170 may include any number of controllers operatively coupled to any valves that enables operation of system 170 and combined cycle power system 100 as described herein.

Also, in the exemplary embodiment, bypass steam flow control system 170, including first controller 172, second controller 174, and third controller 176, includes one or more processors (not shown) configured to execute control algorithms and control logic. As used herein, the terms "controller", "control system", and "processor" include any programmable system including systems and microcontrollers, reduced instruction set circuits, application specific integrated circuits, programmable logic circuits, and any other circuit capable of executing the functions described herein. The above examples are exemplary only, and thus are not intended to limit in any way the definition and/or meaning of the term processor. Moreover, controllers 172, 174, and 176 may include sufficient processing capabilities to execute support applications including, without limitation, a Supervisory, Control and Data Acquisition (SCADA) program and a Data Acquisition System (DAS). Moreover, in some embodiments, at least a portion of bypass pressure control system 170 and additional portions (not shown) may be implemented within a broader control system (not shown) that enables operation of combined cycle power system 100 as described herein, including, without limitation, those processors resident within personal computers, remote servers, programmable logic controllers (PLCs), distributed control system cabinets, and hand-held Internet-enabled devices.

Further, in the exemplary embodiment, bypass steam flow control system 170 modulates HP bypass valve 156 to facilitate controlling the flow of high-pressure steam in live steam portion 160 and HP bypass conduit 148 during warm-up periods. Similarly, bypass steam flow control system 170 modulates IP bypass valve 158 to facilitate controlling flow of intermediate-pressure steam in live steam portion 164 and IP bypass conduit 150 during warm-up periods. Moreover, bypass steam flow control system 170 facilitates operative opening and closing control features of MSV 151, MCV 152, ISV 153, and ICV 154 via features that include, without limitation, receiving permissive inputs, transmitting permissive outputs, and transmitting opening and closing commands.

Figure 2:
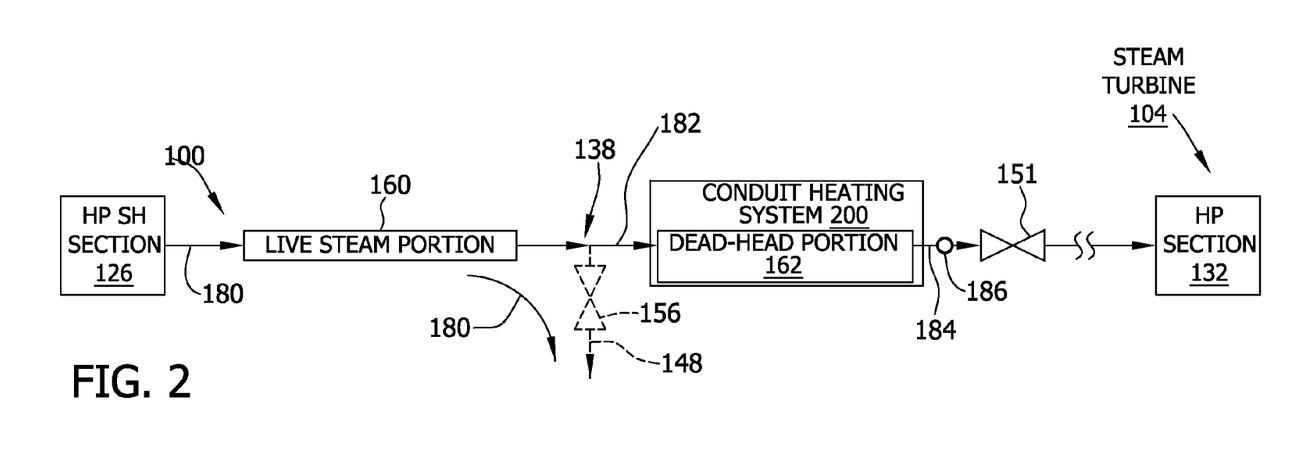
FIG. 2 is a schematic view of an exemplary high pressure steam conduit that may be used with the combined cycle power system shown in FIG. 1.
Figure 3:
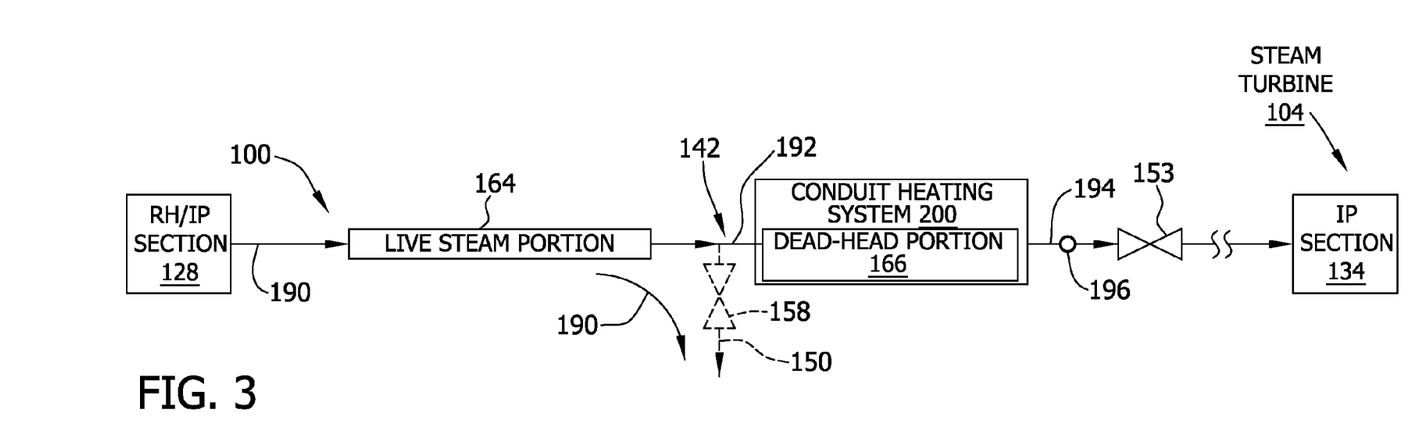
FIG. 3 is a schematic view of an exemplary hot reheat (HRH) steam conduit that may be used with the combined cycle power system shown in FIG. 1.

FIG. 2 is a schematic view of HP superheated steam conduit 138 that may be used with combined cycle power system 100. FIG. 3 is a schematic view of HRH steam conduit 142 that may be used with combined cycle power system 100.

During startups of system 100, steam 180 is channeled from HP superheater section 126 through HP bypass conduit 148 via live steam portion 160 of HP superheated steam conduit 138 and HP bypass valve 156. MSV 151 is closed to isolated HP section 132 of steam turbine 104 from steam that may not have attained the predetermined thermodynamic properties for admission thereto as measured by HRSG HP section instrumentation package 167. Steam 182 enters dead-head portion 162 and is stopped at MSV 151. Heat is transferred from steam 182 and steam 182 cools and condenses to form stagnant liquid 184 in dead-head portion 162, and portion 162 cools to temperatures lower than that of steam 180 as indicated by a main steam temperature sensor 186. Main steam temperature sensor 186 is operatively coupled to bypass steam flow control system 170.

Similarly, during startups of system 100, steam 190 is channeled from RH/IP section 128 through IP bypass conduit 150 via live steam portion 164 of HRH steam conduit 142 and IP bypass valve 158. ISV 153 is closed to isolated IP section 134 of steam turbine 104 from steam that may not have attained the predetermined thermodynamic properties for admission thereto as measured by HRSG IP section instrumentation package 168. Steam 192 enters dead-head portion 166 and is stopped at ISV 153. Heat is transferred from steam 192 and steam 192 cools and condenses to form stagnant liquid 194 in dead-head portion 166, and portion 166 cools to temperatures lower than that of steam 190 as indicated by a reheat steam temperature sensor 196. Reheat steam temperature sensor 196 is operatively coupled to bypass steam flow control system 170.

In the exemplary embodiment, both dead-head portions 162 and 166 include portions of a conduit heating system 200.

Figure 4:
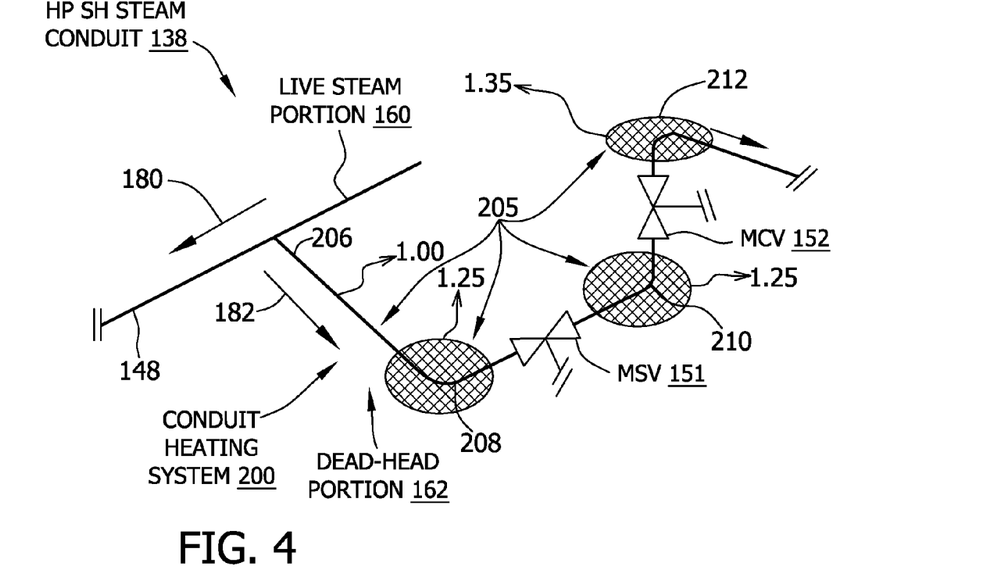
FIG. 4 is an isometric view of the high pressure steam conduit shown in FIG. 2 with a portion of an exemplary conduit heating system.
Figure 5:
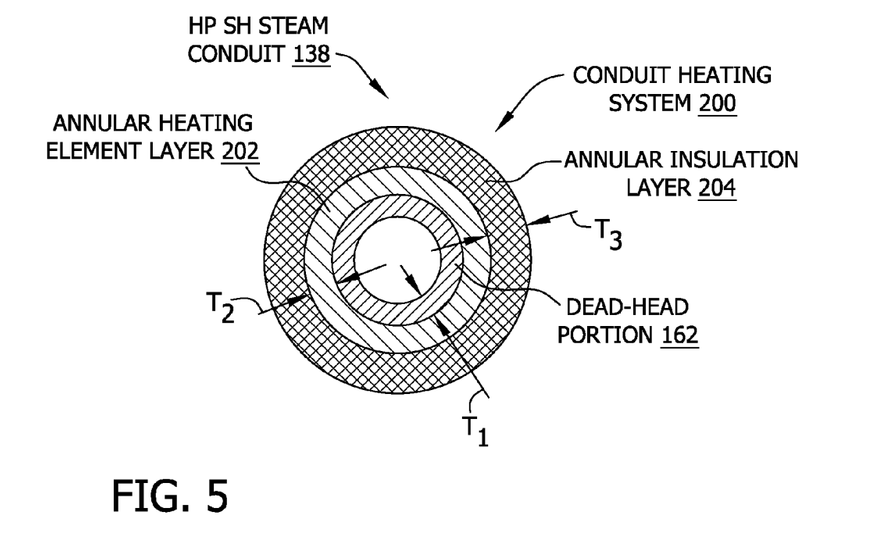
FIG. 5 is a cross-sectional schematic view of a portion of the high pressure steam conduit shown in FIGS. 2 and 4 with a portion of the exemplary conduit heating system shown in FIG. 4 coupled thereto.

FIG. 4 is an isometric view of HP superheated steam conduit 138 with a portion of exemplary conduit heating system 200. FIG. 5 is a cross-sectional schematic view of a portion of HP superheated steam conduit 138 with a portion of exemplary conduit heating system 200 coupled thereto. In the exemplary embodiment, conduit heating system 200 is coupled to dead-head portion 162 and extends from live steam portion 160 to HP section 132, including portions of MSV 151 and MCV 152. Dead-head portion 162 of HP superheated steam conduit 138 has a piping thickness value of $T_1$. Conduit heating system 200 includes an annular heating element layer 202 that circumferentially extends about dead-head portion 162. Heating element layer 202 has a thickness value of $T_2$. Conduit heating system 200 also includes an annular insulation layer 204 that has a thickness value of $T_3$. In the exemplary embodiment, thickness $T_2$ and thickness $T_3$ are determined as a function of variables that include, without limitation, thickness $T_1$ and a metal mass as discussed below.

In the exemplary embodiment, conduit heating system 200 is metal mass-based and is uniquely configured for each of a plurality of piping sections 205. Dead-head portion 162 includes a straight run of piping 206, a first bend 208, a second bend 210, and a third bend 212. Each of straight run 206 and bends 208, 210, and 212 are assigned a numerical value as a function of the mass of metal associated therewith. In the exemplary embodiment, straight run 206 is assigned a predetermined metal mass value of 1.0, wherein the metal mass of straight run 206 is the reference value. First bend 208 and second bend 210 have a 25% greater metal mass than straight run 206, therefore bends 208 and 210 are assigned a metal mass value of 1.25. Third bend 212 has a 35% greater metal mass than straight run 206, therefore a bend 212 is assigned a metal mass value of 1.35. Any shape, configuration, and orientation of portions of dead-head portion 162 facilitates determination of and assignment of a metal mass value. The metal mass values are used to determine a heat input value for the associated portion of piping. Such heat input value facilitates determination of a location, a number, a heating value, a spacing of heating elements (not shown in FIGS. 4 and 5) and thicknesses $T_2$ and $T_3$. In general, those piping sections with a greater metal mass will receive at least one of a greater number and a greater density of heating elements, and a greater heat input value per heating element.

In some embodiments, determinations of "thermal mass" are used to facilitate configuring conduit heating system 200. A "thermal mass" of a material is proportional to the mass of the material. Thermal mass is a characteristic of a material that is substantially equivalent to a thermal capacitance, or a heat capacity, of that material, i.e., the ability of a body to store thermal energy. For example, in general, when piping temperatures in a cycling power plant are subject to fluctuations due to cycling use of a steam generator, a large thermal mass within the insulated portions of the piping runs may facilitate a "flattening out" of the piping temperature fluctuations. This is due to the piping's thermal mass absorbing thermal energy when steam channeled therethrough is higher in temperature than the mass of the piping, and releasing thermal energy therefrom when steam is not channeled therethrough and the surroundings are cooler than the steam piping. The insulation extending about the steam piping facilitates the associated steam piping maintaining high temperatures without reaching thermal equilibrium during short out-of-service durations.

Dead-head portion 166 of HRH steam conduit 142 (both shown in FIG. 3) includes a similar configuration of conduit heating system 200.

Figure 6:
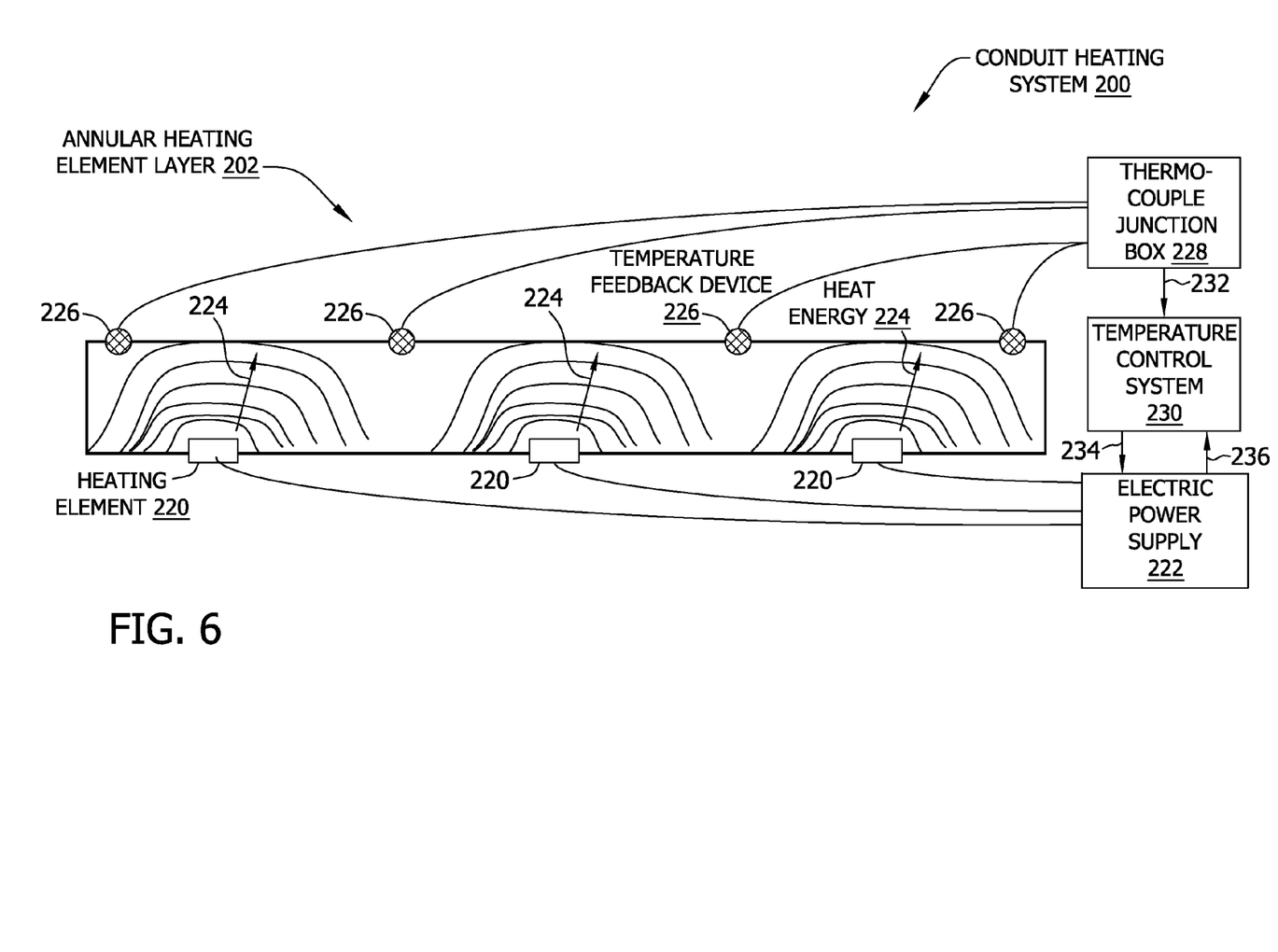
FIG. 6 is a schematic view of a portion of the conduit heating system that may be used with the combined cycle power system shown in FIG. 1.

FIG. 6 is a schematic view of a portion of conduit heating system 200 that may be used with combined cycle power system 100 (shown in FIG. 1). In the exemplary embodiment, conduit heating system 200 includes a plurality of heating elements 220. Heating elements 220 are coupled to an electric power supply 222. When energized, heating elements 220 radiate heat energy 224 that dissipates as a function of distance from heating element 220.

In the exemplary embodiment, heating elements 220 are similar to those heating pads used in heat treatment service. Heating elements 220 are positioned in heating element layer 202 adjacent to dead-head portions 162 and 166. Insulation layer 204 extends over heating element layer 202 to facilitate heat transfer into dead-head portions 162 and 166. Alternatively, any heating devices that enable operation of conduit heating system 200 as described herein are used.

In general, for retrofits in existing power plants, installation of heating elements 220 can be performed by removing existing insulation layer 204 on the targeted piping runs, extending heating element layer 202 thereon, and then extending insulation layer 204 over heating element layer 202.

Conduit heating system 200 also includes a plurality of temperature feedback devices, e.g., thermocouples 226. Alternative embodiments may use any other temperature measurement devices including, without limitation, resistance temperature detectors (RTDs). Conduit heating system 200 further includes a thermocouple junction box 228 to which thermocouples 226 are coupled. Conduit heating system 200 also includes a temperature control system 230 operatively coupled to thermocouple junction box 228 and electric power supply 222. Thermocouple junction box 228 transmits temperature feedback signals 232 to temperature control system 230. Temperature control system 230 transmits electric power demand signals 234 to electric power supply 222. In the exemplary embodiment, electric power demand signals 234 determine an amount of variable electric current (not shown) commanded to be transmitted to each heating element 220 on an individual basis as a function of temperature feedback signals 232. Electric power supply 222 transmits electric power feedback signals 236 to temperature control system 230.

In the exemplary embodiment, temperature control system 230 is a controller including at least one processor (as described above) that is programmed with a plurality of pipe warming optimization algorithms. Such pipe warming optimization algorithms facilitate determining the best method of heating dead-head portions 162 and 166 to meet the required temperature conditions for admission to steam turbine 104. The pipe warming optimization algorithms determine the amount of heating required at various locations in dead-head portions 162 and 166 and a rate of heating that increases the temperatures of portions 162 and 166 at a predetermined rate.

Also, in the exemplary embodiment, temperature control system 230 is programmed with data associated with a metal mass and/or shape of each of piping sections 205, and temperature control system 230 therefore facilitates varying a rate of temperature change in dead-head portions 162 and 166 using such data.

In operation, during startups of combined cycle power system 100, and referring to FIGS. 2, 3, 4, 5, and 6, HP superheater section 126 of HRSG 110 (shown in FIG. 1) generates steam 180 that does not have the thermodynamic properties suitable for admission to HP section 132 of steam turbine 104. HP bypass valve 156 is open and MSV 151 is closed and steam 180 is channeled through HP bypass conduit 148 via live steam portion 160 of HP superheated steam conduit 138. Steam 182 enters dead-head portion 162 and is stopped at MSV 151. Heat is transferred from steam 182 and steam 182 cools and condenses to form stagnant liquid 184 in dead-head portion 162. Portion 162 cools to temperatures lower than that of steam 180 as indicated by main steam temperature sensor 186.

Similarly, in operation, during startups of system 100, steam 190 is channeled from RH/IP section 128 through IP bypass conduit 150 via live steam portion 164 of HRH steam conduit 142 and IP bypass valve 158. ISV 153 is closed to isolate IP section 134 of steam turbine 104 from steam that may not have attained the predetermined thermodynamic properties for admission thereto. Steam 192 enters dead-head portion 166 and is stopped at ISV 153. Heat is transferred from steam 192 and steam 192 cools and condenses to form stagnant liquid 194 in dead-head portion 166, and portion 166 cools to temperatures lower than that of steam 190 as indicated by reheat steam temperature sensor 196.

Also, in operation, temperature control system 230 of conduit heating system 200 generates and transmits electric power demand signals 234 to electric power supply 222. Electric power supply 222 transmits electric current (not shown) to heating elements 220. Each heating element 220 receives electric current as a function of temperature feedback signals 232 transmitted from each of thermocouples 226 and forwarded to temperature control system 230 via thermocouple junction box 228. Heat energy 224 is transmitted through heating element layer 202 into dead-head portions 162 and 166. Dead-head portions 162 and 166 increase in temperature at a predetermined rate and such temperatures are measured by main steam temperature sensor 186 and reheat steam temperature sensor 196, respectively.

Electric current is varied through each individual heating element 220 and may be temporarily discontinued depending on the measured rate of temperature increase as measured by thermocouples 226. The rate of temperature increase is controlled to not induce excessive stresses on dead-head portions 162 and 166. In the exemplary embodiment, an upper parameter on a rate of temperature increase is 260 degrees Celsius (° C.) (500 degrees Fahrenheit (° F.)) per hour. Based on the starting time of combined cycle power system 100, dead-head portions 162 and 166 can be warmed up at any rate to meet the required steam conditions at a particular instant of time. In the exemplary embodiment, the pipe warming optimization algorithms programmed in temperature control system 230 reduce delays associated with heating dead-head portions 162 and 166 by controlling the rate warm-up of portions 162 and 166 to approximately coincide with attainment of steam admission conditions within steam channeled from HRSG 110. Alternatively, any heating start time, any heating stop time, and any rate of temperature increase are used that enable operation of combined cycle power system 100 and conduit heating system 200 as described herein.

In the exemplary embodiment, conduit heating system 200 is operatively coupled to bypass flow control system 170 (shown in FIG. 1). More specifically, controllers 172, 174, and 176 (all shown in FIG. 1) are operatively coupled to temperature control system 230. Therefore, once the piping conditions of dead-head portions 162 and 164 are approximately similar to the steam conditions in steam 180 and 190, respectively, and steam 180 and 190 have the properties for admission to steam turbine 104, MSV 151, MCC 152, ISV 153, and ICV 154 open. Steam is allowed to flow to steam turbine 104 and heating elements 220 are de-energized. Further warm-up of dead-head portions 162 and 164 is accomplished by steam 180 and 190 flowing therethrough.

Figure 7:
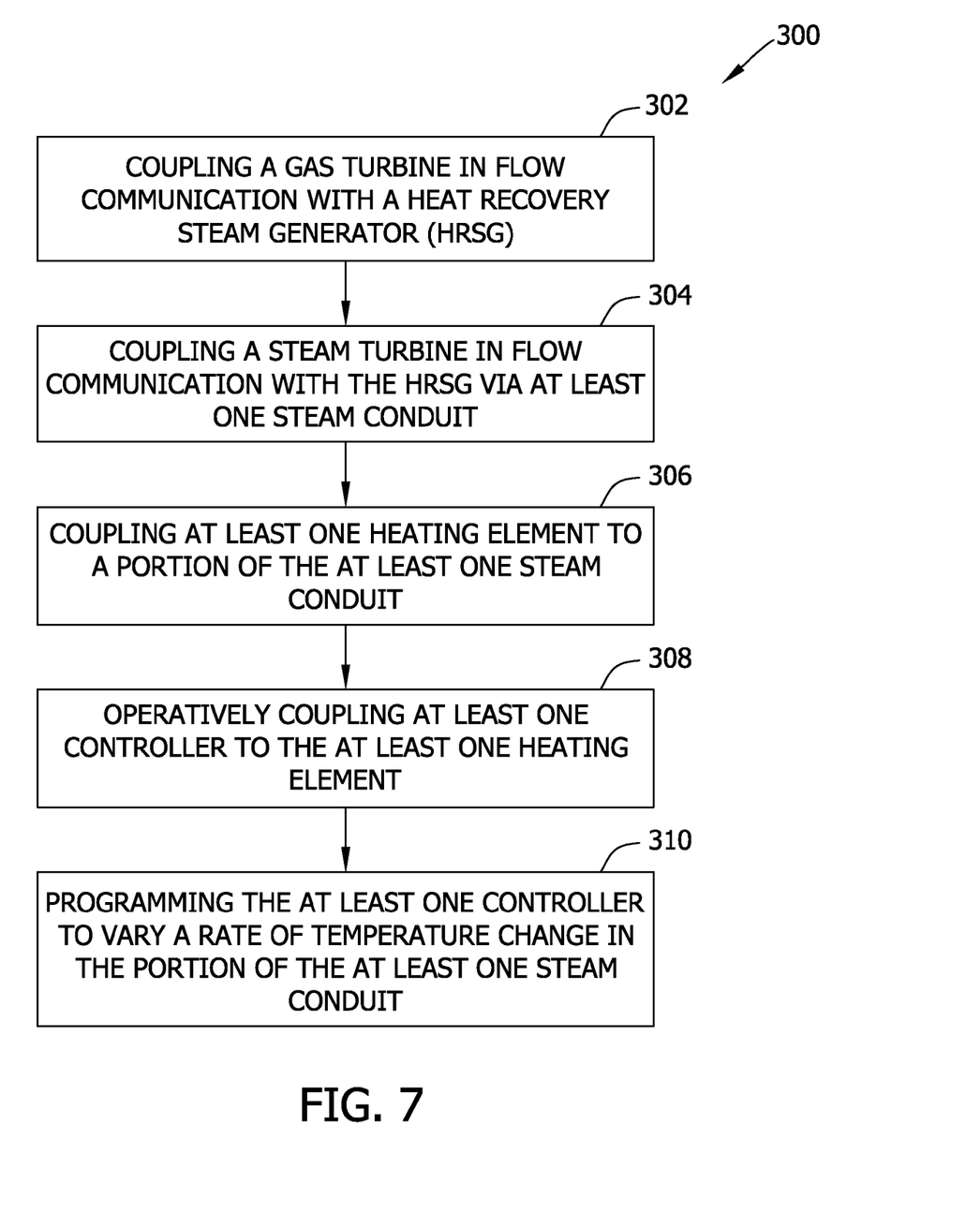
FIG. 7 is a flowchart of an exemplary method of assembling the combined cycle power generation system shown in FIG. 1.

FIG. 7 is a flowchart of an exemplary method of assembling combined cycle power generation system 100 (shown in FIG. 1). In the exemplary embodiment, gas turbine 102 (shown in FIG. 1) is coupled 302 in flow communication with HRSG 110 (shown in FIG. 1). Steam turbine 102 (shown in FIG. 1) is coupled 304 in flow communication with HRSG 110 via HP superheated steam conduit 138, CRH steam conduit 140, HRH steam conduit 142, and LP steam conduit 144 (all shown in FIG. 1). At least one heating element 220 (shown in FIG. 6) is coupled 306 to dead-head portion 162 (shown in FIG. 1) of HP superheated steam conduit 138 and dead-head portion 166 (shown in FIG. 1) of HRH steam conduit 142. Temperature control system 230 (shown in FIG. 6) is operatively coupled 308 to heating element 220. Temperature control system 230 is programmed 310 to vary a rate of temperature change in dead-head portions 162 and 166.

Described herein are exemplary embodiments of combined cycle power systems that facilitate improved commercial operation over that of known combined cycle power systems. The above-described methods and apparatus facilitate reducing delays during starting and loading as compared to starting and loading with known combined cycle systems. Such methods and apparatus also facilitate reduced fuel consumption during the starting and loading periods as compared to known combined cycle systems. Specifically, the above-described methods and apparatus enable combined cycle power plants to start up faster and reach a desired steam turbine loading in a shorter time as compared to other known start-up methods and apparatus. More specifically, the conduit heating system as described herein facilitates heating cool, stagnant fluid in portions of steam piping such that the associated piping and the fluid therein are suitable for admission to steam turbines. In contrast to known combined cycle systems, the conduit heating system as described herein, decreases the time to start combined cycle systems. Moreover, in contrast to known combined cycle systems, the embodiments of the conduit heating system and processes as described herein significantly reduce the time periods required to hold the admission of steam to a steam turbine for piping warm-up. As a result, steam may be admitted to the steam turbine earlier than with known combined cycle systems, thereby accelerating commercial electric power generation. As such, the methods and apparatus described herein facilitate reducing the fuel consumption and emissions, while increasing the revenue of a power plant.

An exemplary technical effect of the methods, systems, and apparatus described herein includes at least one of (a) decreasing a startup time for combined cycle power systems; (b) reducing fuel consumption during startups of combined cycle power systems; (c) reducing emissions generated during startups of combined cycle power systems; and (d) reducing thermal stresses on steam piping in combined cycle power systems, thereby extending a useful life of the steam piping.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit, and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A method for assembling a combined cycle power generation system, said method comprising:
coupling a gas turbine in flow communication with a heat recovery steam generator (HRSG);
coupling a steam turbine in flow communication with the HRSG via at least one steam conduit;
positioning a steam turbine inlet valve within the at least one steam conduit to control admission of steam to the steam turbine:
positioning a bypass conduit upstream the steam turbine inlet valve to initially bypass the steam turbine until a pressure and a temperature are within respective ranges suitable for admitting steam to the steam turbine during a startup procedure;
coupling at least one layer of at least one heating element to a portion of the at least one steam conduit between the bypass conduit and the steam turbine inlet valve, wherein the at least one heating element includes a plurality of layers;
operatively coupling at least one controller to the at least one heating element; and
programming the at least one controller to vary a rate of temperature change in the portion of the at least one steam conduit.

2. A method in accordance with claim 1, wherein programming the at least one controller to vary a rate of temperature change in the portion of the at least one steam conduit comprises programming the controller with data associated with at least one of:
a mass of the portion of the at least one steam conduit; and
a shape of the portion of the at least one steam conduit.

3. A method in accordance with claim 1, wherein further comprising operatively coupling the at least one controller to at least one of:
a temperature sensor positioned within the portion of the at least one steam conduit; and
a temperature sensor positioned within the HRSG.

4. A method in accordance with claim 1, wherein coupling at least one heating element to a portion of the at least one steam conduit comprises coupling a plurality of heating elements to a plurality of portions of the steam conduit, each heating element of the plurality of heating elements sized to vary the rate of temperature change in the each portion of the plurality of portions of the steam conduit as a function of at least one of:
a mass of each portion of the plurality of portions of the steam conduit; and
a shape of each portion of the plurality of portions of the steam conduit.

5. A method in accordance with claim 1, further comprising at least one of:

operatively coupling the at least one controller to a steam turbine bypass valve;

operatively coupling the at least one controller to the steam turbine inlet valve; and further programming the at least one controller to vary a position of the steam turbine bypass valve and the steam turbine inlet valve as a function of a temperature of the portion of the at least one steam conduit.

6. A steam conduit heating system comprising:

at least one valve positioned within a steam conduit to control admission of steam to a steam turbine;

a bypass conduit upstream the at least one valve to initially bypass the steam turbine until a pressure and a temperature are within respective ranges suitable for admitting steam to the steam turbine during a startup procedure;

at least one layer of at least one heating element coupled to at least a portion of the steam conduit between the bypass conduit and the at least one valve, wherein said at least one heating element comprises a plurality of layers; and at least one conduit heating controller operatively coupled to said at least one heating element and programmed to vary a rate of temperature change in the portion of the steam conduit, wherein said at least one controller is further programmed to vary the rate of temperature change in the portion of the steam conduit as a function of at least one of:

a mass of the portion of the steam conduit; and a shape of the portion of the steam conduit.

7. A steam conduit heating system in accordance with claim 6, wherein said at least one conduit heating controller is further programmed to vary the rate of temperature change in the portion of the steam conduit as a function of at least one of:

a temperature of the portion of the steam conduit; and a temperature of steam channeled from a heat recovery steam generator (HRSG).

8. A steam conduit heating system in accordance with claim 6, wherein said at least one heating element comprises a plurality of heating elements, each said heating element of said plurality of heating elements sized to vary the rate of temperature change in the portion of the steam conduit as a function of at least one of:

a mass of the portion of the steam conduit; and a shape of the portion of the steam conduit.

9. A steam conduit heating system in accordance with claim 6, wherein said at least one conduit heating controller is operatively coupled to at least one steam turbine inlet valve controller programmed to control admission of steam to a steam turbine, said at least one conduit heating controller is programmed to transmit permissive signals to the at least one steam turbine inlet valve controller.

10. A steam conduit heating system in accordance with claim 9, wherein said at least one conduit heating controller is operatively coupled to at least one steam turbine bypass valve controller programmed to control bypassing steam around the steam turbine, said at least one conduit heating controller is programmed to transmit permissive signals to the at least one steam turbine bypass valve controller.

11. A combined cycle power generation system comprising:

a gas turbine coupled to a first generator;

a steam turbine coupled to a second generator;

a heat recovery steam generator (HRSG) coupled to said steam turbine and said gas turbine, said HRSG coupled in flow communication to said steam turbine via at least one steam conduit;

a steam turbine inlet valve positioned within the at least one steam conduit to control admission of steam to the steam turbine;

a bypass conduit upstream the steam turbine inlet valve to initially bypass the steam turbine until a pressure and a temperature are within a respective range suitable for admitting steam to the steam turbine during a startup procedure;

a conduit heating system coupled to a portion of said at least one steam conduit between the bypass conduit and the steam turbine inlet valve, said conduit heating system comprising:

at least one layer of at least one heating element conduit, wherein said at least one heating element comprises a plurality of layers; and at least one controller operatively coupled to said at least one heating element and programmed to vary a rate of temperature change in said portion of said at least one steam conduit.

12. A combined cycle power generation system in accordance with claim 11, wherein said at least one controller is further programmed to vary the rate of temperature change in said portion of said at least one steam conduit as a function of at least one of:

a mass of said portion of said at least one steam conduit; and a shape of said portion of said at least one steam conduit.

13. A combined cycle power generation system in accordance with claim 11, wherein said at least one controller is further programmed to vary the rate of temperature change in said portion of said at least one steam conduit as a function of at least one of:

a temperature of said portion of said at least one steam conduit; and a temperature of steam channeled from said HRSG.

14. A combined cycle power generation system in accordance with claim 11, wherein said at least one heating element comprises a plurality of heating elements, each said heating element of said plurality of heating elements sized to vary the rate of temperature change in said portion of said at least one steam conduit as a function of at least one of:

a mass of said portion of said at least one steam conduit; and a shape of said portion of said at least one steam conduit.

15. A combined cycle power generation system in accordance with claim 11, further comprising a steam turbine bypass valve; said at least one controller further programmed to vary a position of said steam turbine bypass valve and said steam turbine inlet valve as a function of a temperature of said portion of said at least one steam conduit.

* * * * *